(12) United States Patent
Lin et al.

(10) Patent No.: US 11,055,466 B2
(45) Date of Patent: Jul. 6, 2021

(54) BLOCK LEVEL DESIGN METHOD FOR HETEROGENEOUS PG-STRUCTURE CELLS

(71) Applicant: Taiwan Semiconductor Manufacturing Co., Ltd., Hsin-Chu (TW)

(72) Inventors: Yen-Hung Lin, Hsinchu (TW); Yuan-Te Hou, Hsinchu (TW); Chung-Hsing Wang, Hsinchu County (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 0 days.

(21) Appl. No.: 16/719,481

(22) Filed: Dec. 18, 2019

(65) Prior Publication Data
US 2020/0125783 A1 Apr. 23, 2020

Related U.S. Application Data

(62) Division of application No. 15/723,308, filed on Oct. 3, 2017, now Pat. No. 10,515,175.

(60) Provisional application No. 62/434,693, filed on Dec. 15, 2016.

(51) Int. Cl.
| | | |
|---|---|---|
| G06F 30/30 | (2020.01) | |
| G06F 30/392 | (2020.01) | |
| G06F 30/39 | (2020.01) | |
| G06F 30/398 | (2020.01) | |
| G06F 119/06 | (2020.01) | |

(52) U.S. Cl.
CPC ............ *G06F 30/392* (2020.01); *G06F 30/39* (2020.01); *G06F 30/398* (2020.01); *G06F 2119/06* (2020.01)

(58) Field of Classification Search
None
See application file for complete search history.

(56) References Cited

U.S. PATENT DOCUMENTS

| | | | |
|---|---|---|---|
| 6,083,271 A | 7/2000 | Morgan | |
| 6,476,497 B1 | 11/2002 | Waldron | |
| 6,617,621 B1 | 9/2003 | Gheewala | |
| 9,165,103 B1 | 10/2015 | Salowe | |
| 9,460,258 B2 * | 10/2016 | Peart | G06F 30/392 |
| 9,904,752 B2 | 2/2018 | Lee | |
| 10,147,714 B2 * | 12/2018 | Wang | H01L 27/0207 |

(Continued)

OTHER PUBLICATIONS

W.-K. Chow et al., "Legalization Algorithm for Multiple-Row Height Standard Cell Design," ACM DAC, Jun. 5-9, 2016, 6 pages. (Year: 2016).*

(Continued)

*Primary Examiner* — Leigh M Garbowski
(74) *Attorney, Agent, or Firm* — Duane Morris LLP

(57) ABSTRACT

A partitioning method for partitioning a group of power-ground (PG) cells is disclosed. The method includes: placing at least one out-boundary PG cell on a substrate, wherein power strips of the at least one out-boundary PG cell are aligned with corresponding power rails on the substrate; and placing at least one in-boundary PG cell on the substrate, wherein power strips of the at least one in-boundary PG cell are aligned with corresponding power rails on the substrate.

20 Claims, 7 Drawing Sheets

(56) References Cited

U.S. PATENT DOCUMENTS 10,490,542 B2 * 11/2019 Nelson .................... G06F 30/39
2018/0090440 A1 * 3/2018 Schultz .............. H01L 23/5226

OTHER PUBLICATIONS

Cai, Y. et al., "Relaxed Hierarchical Power/Ground Grid Analysis", ASP-DAC, 2005, IEEE, pp. 1090-1093.

* cited by examiner

BLOCK LEVEL DESIGN METHOD FOR HETEROGENEOUS PG-STRUCTURE CELLS

CROSS-REFERENCE TO RELATED APPLICATION

The present application is a divisional of U.S. patent application Ser. No. 15/723,308, filed on Oct. 3, 2017, which claims priority to U.S. Provisional Patent Application No. 62/434,693, filed on Dec. 15, 2016, each of which is incorporated by reference herein in its entirety.

BACKGROUND

With the rapid development of mobile devices, internet of things ("IoT") and system on a chip ("SoC"), the demand for low power for silicon chips has significantly increased. IoT is the internetworking of physical devices, vehicles (a.k.a. "connected devices" and "smart devices"), buildings and other items which are embedded with electronics, software, sensors, actuators, and network connectivity that enable these objects to collect and exchange information. SoC is an integrated circuit ("IC") that integrates all components of a computer or other electronic system into a single chip. SoC may contain digital, analog, mixed-signal, and radio-frequency functions, all of which reside on a single chip substrate. Due to their low power-consumption, SoCs are widely implemented in mobile electronics and IoT.

Advances in integrated circuit manufacturing processes have enabled SoC designs with ever increasing complexities and functions that consume more power. In order to extend battery life, reduce overall system cost and improve market competitiveness, mobile devices and IoT devices require low-power chip designs.

Such demand for low-power chip-design requires that design tools communicate low-power design parameters in a single, standard format to achieve low-power design efficiency. In the power domain of the low-power design parameters, the power-ground ("PG") nets and connectivity are determining factors for the chip efficiency. As discussed herein, a cell with power-ground strips is called a PG cell.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
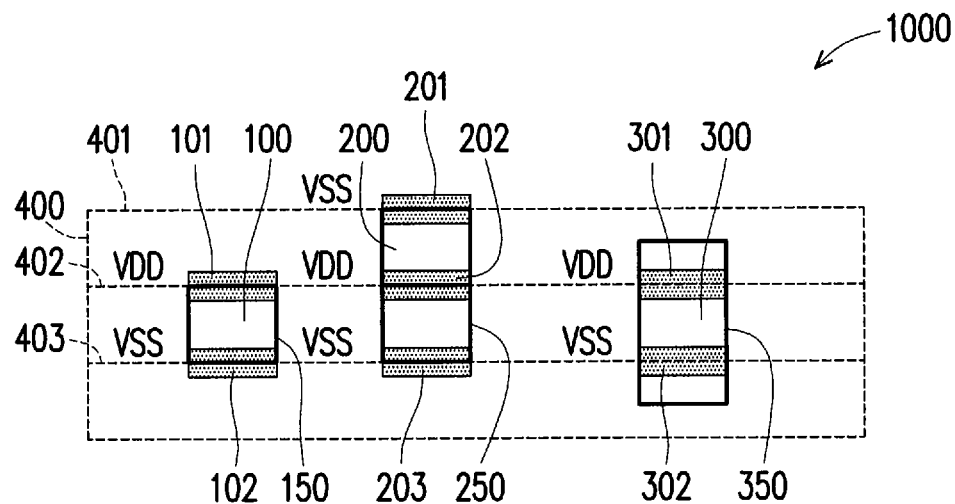
FIG. 1 illustrates a layout design of two out-boundary PG cells and one in-boundary PG cell forming a heterogeneous PG cell structure, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a layout 1000 of two out-boundary PG cells and an in-boundary PG cell, in accordance with some embodiments. According to some embodiments, the layout 1000 includes a first out-boundary PG cell 100 having a first power strip 101 that provides a first power level VDD to the cell 100, and a second power strip 102 that provides a second power level VSS to the cell 100. The first out-boundary PG cell 100 is laid on the top of a substrate 400, with power strip 101 aligned with power rail 402 and power strip 102 aligned with power rail 403 for proper power arrangement. The layout design 1000 further includes a second out-boundary PG cell 200 with a height approximately twice the height of the cell 100, in accordance with some embodiments. The second out-boundary PG cell 200 includes a first power strip 201 that provides the second power level VSS to the cell 200, a second power strip 202 that provides the first power level VDD to the cell 200, and a third power strip 203 that provides the first power level VSS. The second out-boundary PG cell 200 is also laid on the top of the substrate 400, and the power strips 201, 202 and 203 are aligned with corresponding power rails 401, 402 and 403 for proper power arrangement. The layout design 1000 further includes an in-boundary PG cell 300, which includes a VDD power strip 301 and a VSS power strip 302 aligned with corresponding power rails 402 and 403, respectively, for power management.

The cell 100 is an "out-boundary PG cell" because the VDD power strip 101 and the VSS power strip 102 are not enclosed within the cell boundary 150 of the cell 100, as shown in FIG. 1. Similarly, the cell 200 is an out-boundary PG cell because the VSS power strip 201 and the VSS power strip 203 are not enclosed within the cell boundary 250. In comparison, the cell 300 is an "in-boundary PG cell" because the VDD power strip 301 and the VSS power strip 302 are both enclosed within the cell boundary 350 of cell 300. As shown in FIG. 1, the VDD power strip 101 of the cell 100 and the VDD power strip 301 of the cell 300 are both aligned with power rail 402; similarly, the VSS power strip 102 of the cell 100 and the VSS power strip 302 of the cell 300 are both aligned with the power rail 403. Due to the fact that the cell 100 is an out-boundary PG cell and the cell 300 is an in-boundary PG cell, the height of the cell 300 is larger than the height of the cell 100. According to some embodiments, an in-boundary PG cell has a larger height than a corresponding out-boundary PG cell. For this reason, conventional design methods cannot handle both in-boundary PG cells and out-boundary PG cells in the same design block, which are discussed further below in connection with FIG. 2. According to some embodiments, both an out-boundary PG cell and an in-boundary PG cell are implemented in the same design block, thereby reducing area on the substrate required by the cells.

Figure 2:
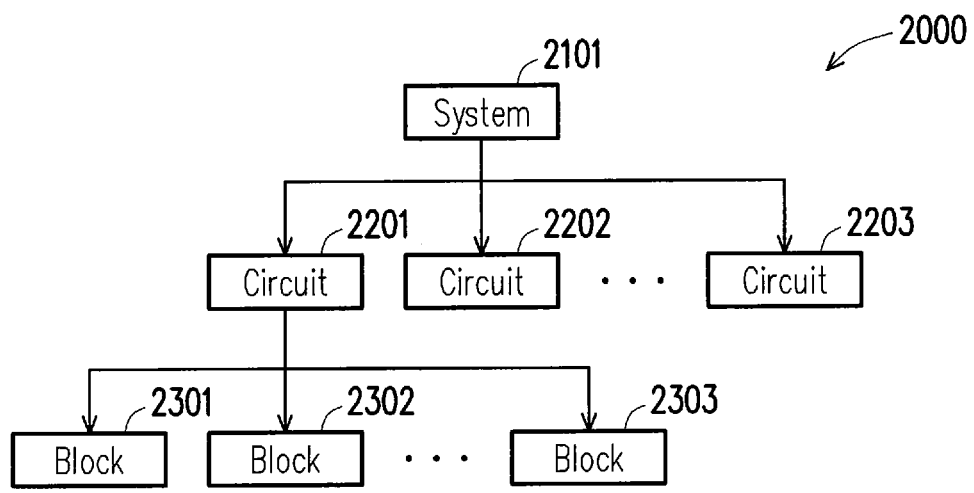
FIG. 2 is a block diagram of a circuit design hierarchy, in accordance with some embodiments.

FIG. 2 is a block diagram of a system design hierarchy, in accordance with some embodiments. According to some embodiments, a system design hierarchy 2000 includes a system 2101, which further includes a plurality of circuits 2201, 2202, 2203, and so on. Each circuit further includes a plurality of blocks 2301, 2302, 2303 and so on. According to some embodiments, one or more of the plurality of blocks includes both in-boundary PG cell structure and out-boundary PG cell structure optimizes the overall power efficiency and performance. In addition, a block including both in-boundary PG cell structure and out-boundary PG cell structure minimizes the chip area.

Figure 3:
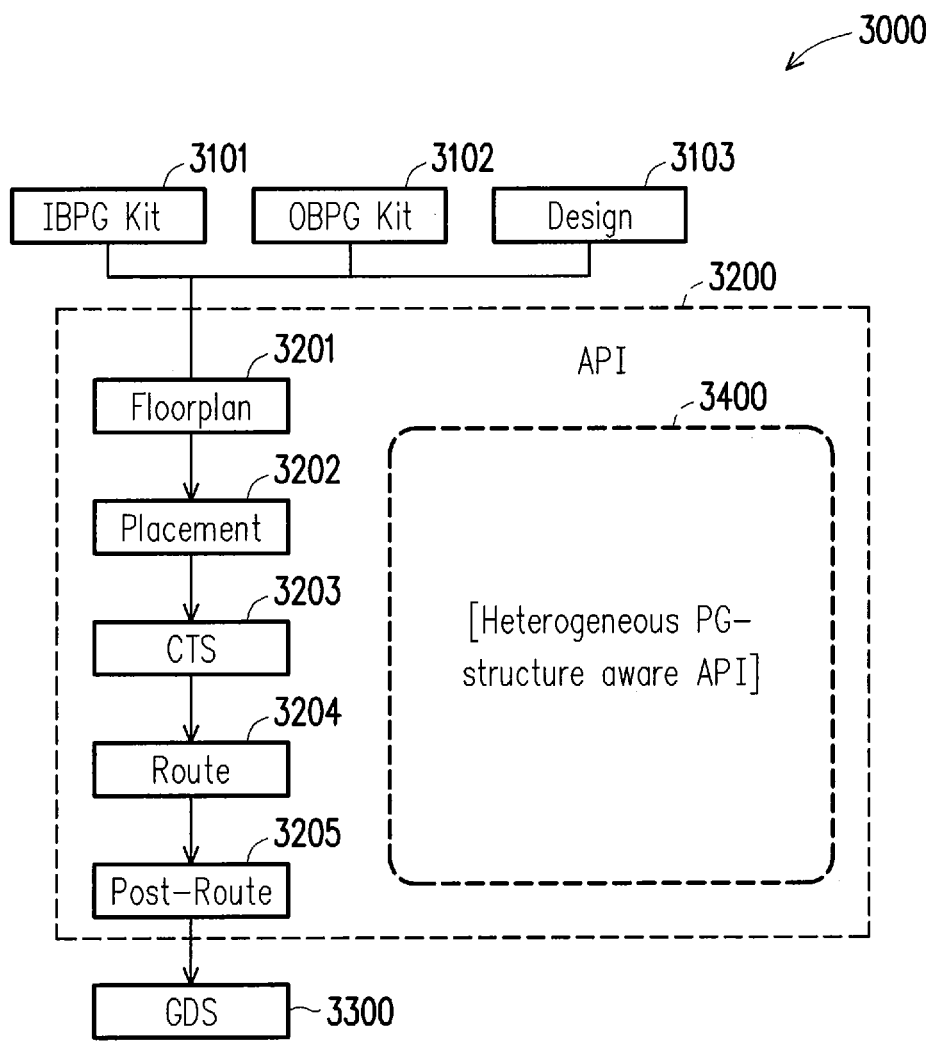
FIG. 3 is a block diagram illustrating a design method for a heterogeneous PG cell structure, in accordance with some embodiments.

FIG. 3 is a block diagram illustrating a design method for a heterogeneous PG cell structure, in accordance with some embodiments. According to some embodiments, the design system 3000 includes an in-boundary PG cell tool kit ("IBPG Kit") 3101 for processing in-boundary PG cells, an out-boundary PG cell tool kit ("OBPG Kit") 3102, and a design kit 3103. According to some embodiments, the design system is an Electronic Design Automation ("EDA") tool. According to some embodiments, the EDA tool is provided by Cadence EDA software. According to some embodiments, the design system 3000 also includes an application programming interface ("API") 3200 and a geometry design system ("GDS") 3300. In accordance with some embodiments, the API 3200 includes a floorplan unit 3201, a placement unit 3202, a clock tree synthesis ("CTS") unit 3203, a route unit 3204, a post-route unit 3205, and a heterogeneous PG-structure aware API unit 3400, which will be described in further detail below.

According to some embodiments, the IBPG Kit 3101, OBPG Kit 3102 and the design kit 3103 provide design parameters as input to the application programming interface 3200. Upon receiving this input data, the floorplan unit 3201 groups or partitions the received circuit blocks into functional modules. Next, the placement unit 3202 places the modules in a layout according to design rules. Next, the CTS unit 3203 synthesizes clock trees for proper timing and clocking. After the timing and clocking are properly arranged, the route unit 3204 arranges circuit routes appropriately. Finally, the post-route unit 3205 conducts post-route processing for timing optimization. When the post-route processing is finished, the file is saved in GDS format for further processing.

According to another embodiment, the units 3201 through 3205 are heterogeneous PG-structure aware, which means that during the design process, a single block is allowed to include both in-boundary PG cells and out-boundary PG cells for improved performance and power efficiency.

According to some embodiment, the design system 3000 creates a layout of a circuit based on input data using the IBPG Kit 3101, the OBPG Kit 3102, the design kit 3103, the API 3200 and the GDS 3300. For example, the input data includes information regarding the out-boundary PG cells, the in-boundary PG cells, and the relational information between such out-boundary PG cells and in-boundary PG cells. By using the IBPG Kit 3101, the OBPG Kit 3102, the design kit 3103, the API 3200 and the GDS 3300, the deployment of out-boundary PG cells and/or in-boundary PG cells are optimized to achieve maximized efficiency in power and routing. According to some embodiment, an IC is then fabricated based on the layout of the circuit which has been optimized by the system and method discussed above. The IC fabricated as a result achieves maximized efficiency in power and routing.

Figure 4:
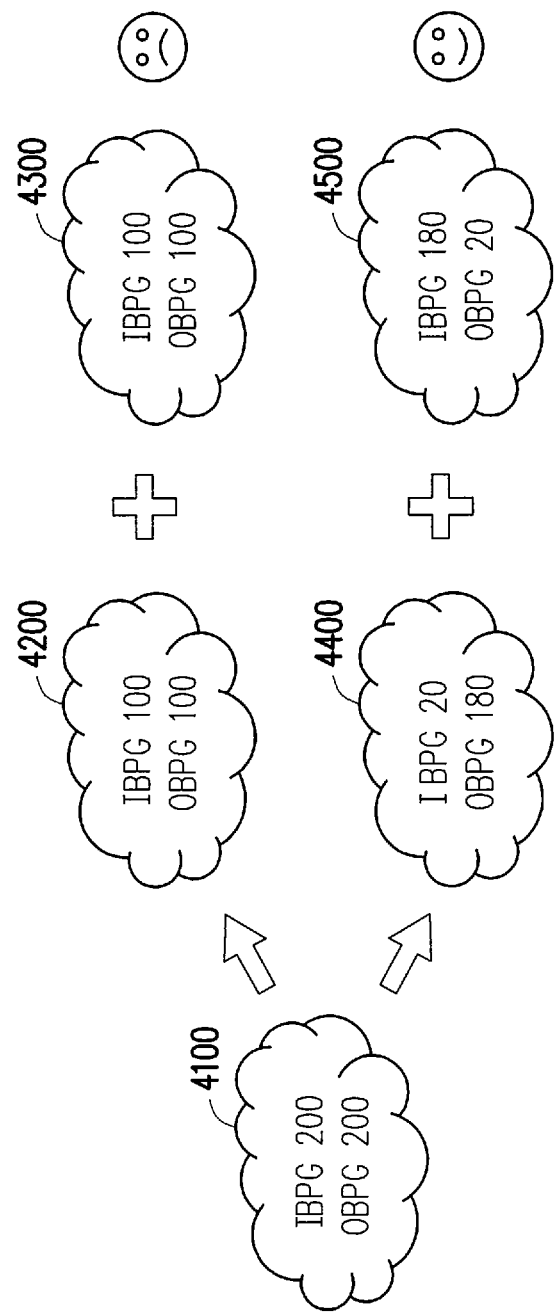
FIG. 4 is a schematic illustration of a partitioning of a heterogeneous PG cell structure, in accordance with some embodiments.

FIG. 4 is a schematic illustration of a partitioning process of a heterogeneous PG cell structure, in accordance with some embodiments. As a non-limiting example, assume that there are 200 in-boundary PG cells and 200 out-boundary PG structures in a floorplan 4100 provided to the floorplan unit 3201 in FIG. 3. The heterogeneous PG structure aware API 3400 performs partitioning to optimize the power and performance and minimize the area consumed. According to some embodiments, the design system 3000 performs the following optimization:

$$\begin{cases} A(IBPG)_{all} = \sum_{i=1}^{n} A(IBPG)_i \\ A(OBPG)_{all} = \sum_{i=1}^{n} A(OBPG)_i \\ \exists\, i \in n,\ \text{maximized}|A(IBPG)_i - A(OPBG)_i| \end{cases}$$

wherein A(IBPG)i and A(OBPG)i represent in-boundary power-ground layout design area and out-boundary power-ground layout design area respectively.

According to some embodiments, the design system 3000 maximizes the area difference between in-boundary PG cells and out-boundary PG cells. For example, the floor plan 4100 is partitioned into floorplans 4200 and 4300, in which, the floorplan 4200 includes 100 in-boundary PG cells and 100 out-boundary PG cells, and the floorplan 4300 includes 100 in-boundary PG cells and 100 out-boundary PG cells. The resulting partitioning into floorplans 4200+4300 does not maximize the area difference between in-boundary PG cells and out-boundary PG cells. As another example, the floorplan 4100 is partitioned into floorplans 4400 and 4500, in which the floorplan 4400 includes 20 in-boundary PG cells and 180 out-boundary PG cells, and the floorplan 4500 includes 180 in-boundary PG cells and 20 out-boundary PG cells. The resulting partitioning into floorplans 4400+4500 does maximize the area difference between in-boundary PG cells and out-boundary PG cells. In partition 4200 and partition 4300 containing 100 in-boundary PG and 100 out-boundary, the difference between in-boundary PG and out-boundary is zero. In partition 4400 and partition 4500, the difference between in-boundary PG and out-boundary is 160.

Figure 5:
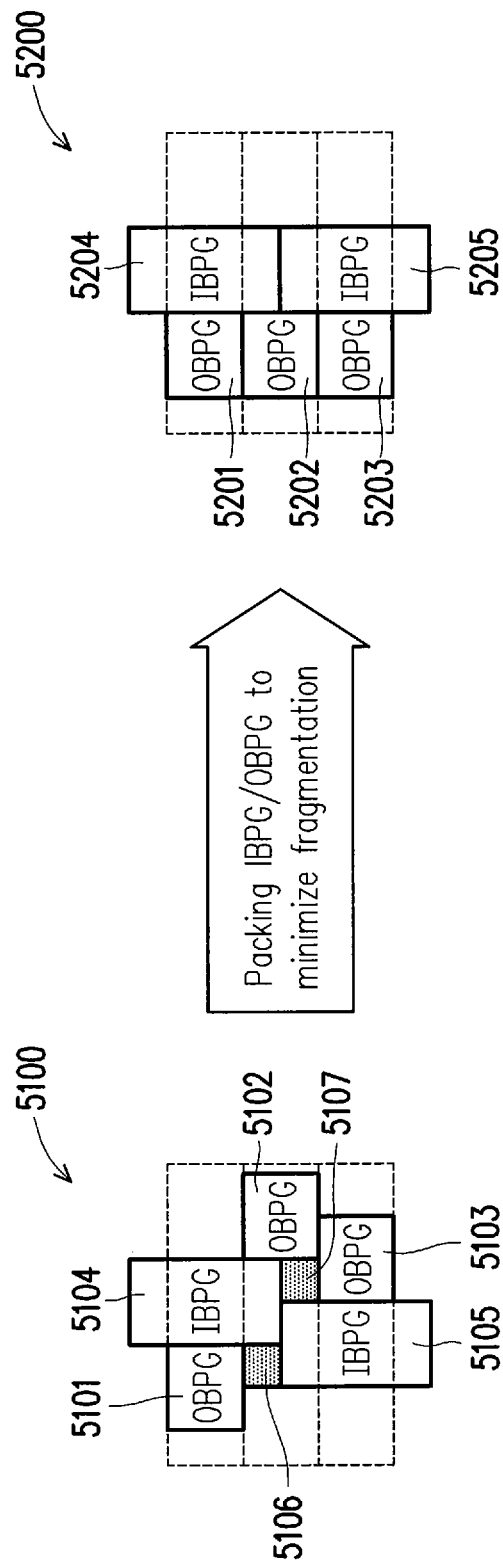
FIG. 5 is a schematic illustration of the legalization of a heterogeneous PG cell structure, in accordance with some embodiments.

FIG. 5 is a schematic illustration of a legalization process of a heterogeneous PG cell structure in which an initial floorplan 5100 is re-arranged into a legalized floorplan 5200, in accordance with some embodiments. According to some embodiments, a floorplan 5100 includes out-boundary PG cells 5101, 5102, 5103, and in-boundary PG cells 5104 and 5105. Due to the size differences between in-boundary PG cells and out-boundary PG cells, there are fragmentations 5106 and 5107 between in-boundary PG cells and out-boundary PG cells. According to some embodiments, the optimization process in the heterogeneous PG structure aware API 3400 performs cell legalization by minimizing cell fragmentations 5106 and 5107. According to some embodiments, for example, the out-boundary PG cells 5201, 5202 and 5203 are packed together as shown on the right side of FIG. 5, with their corresponding power strip properly aligned with power rails on the substrate, as illustrated in FIG. 1. Similarly, the in-boundary PG cells a 5204 and 5205 are packed together as shown on the right side of FIG. 5, with their corresponding power strip properly aligned with power rails on the substrate, as illustrated in FIG. 1. In the re-arranged floorplan 5200, the fragmentations 5106 and 5107 are removed. According to some embodiments, in re-arranging PG cells, displacement of PG cells are appropriately minimized, and the area required by the PG cells is reduced or minimized.

Figure 6:
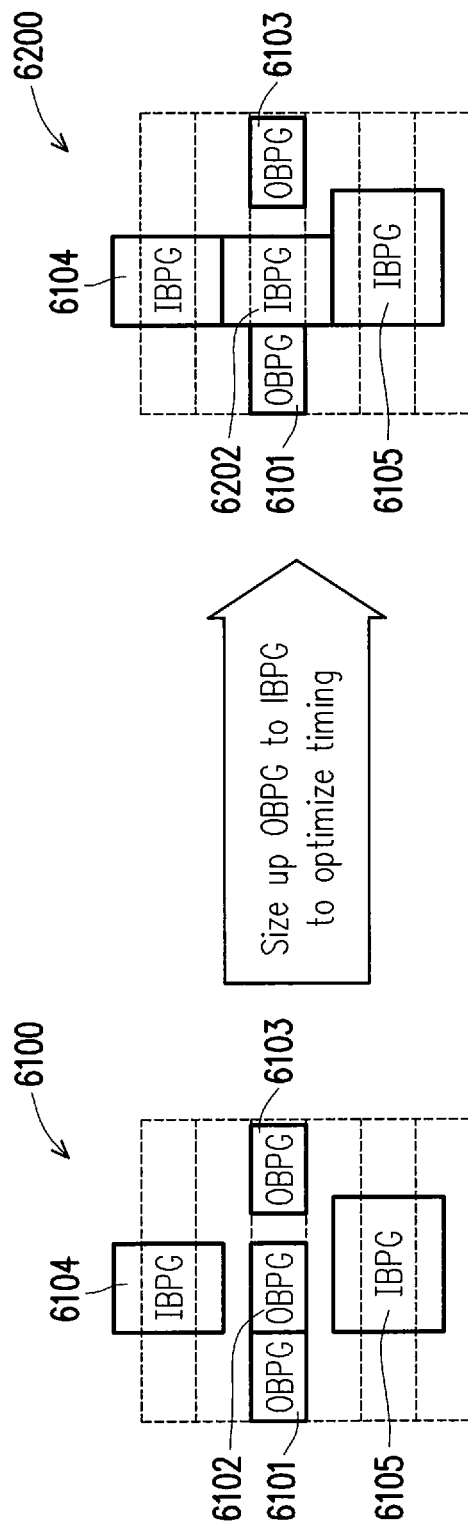
FIG. 6 is a schematic illustration of a process of optimizing a heterogeneous PG cell structure, in accordance with some embodiments.

FIG. 6 is a schematic illustration of a process of optimizing a heterogeneous PG cell structure, in accordance with some embodiments. According to some embodiments, an initial floorplan 6100 includes out-boundary PG cells 6101, 6102 and 6103, with their corresponding power strips properly aligned with corresponding power rails of the substrate. The floorplan 6100 also includes in-boundary PG cells 6104 and 6105. According to some embodiments, in order to optimize timing of the floorplan, due to the constraint that there is no space to change the small-driving out-boundary PG cell into large driving out-boundary PG cells, the out-boundary PG cell 6102 is changed into an in-boundary PG cell 6202 without introducing displacements, with its original power strips properly aligned with corresponding power rails, thereby optimizing the power efficiency and timing of the floorplan. According to some embodiments, small-driving cells imply small-area cells, and vice versa.

Figure 7:
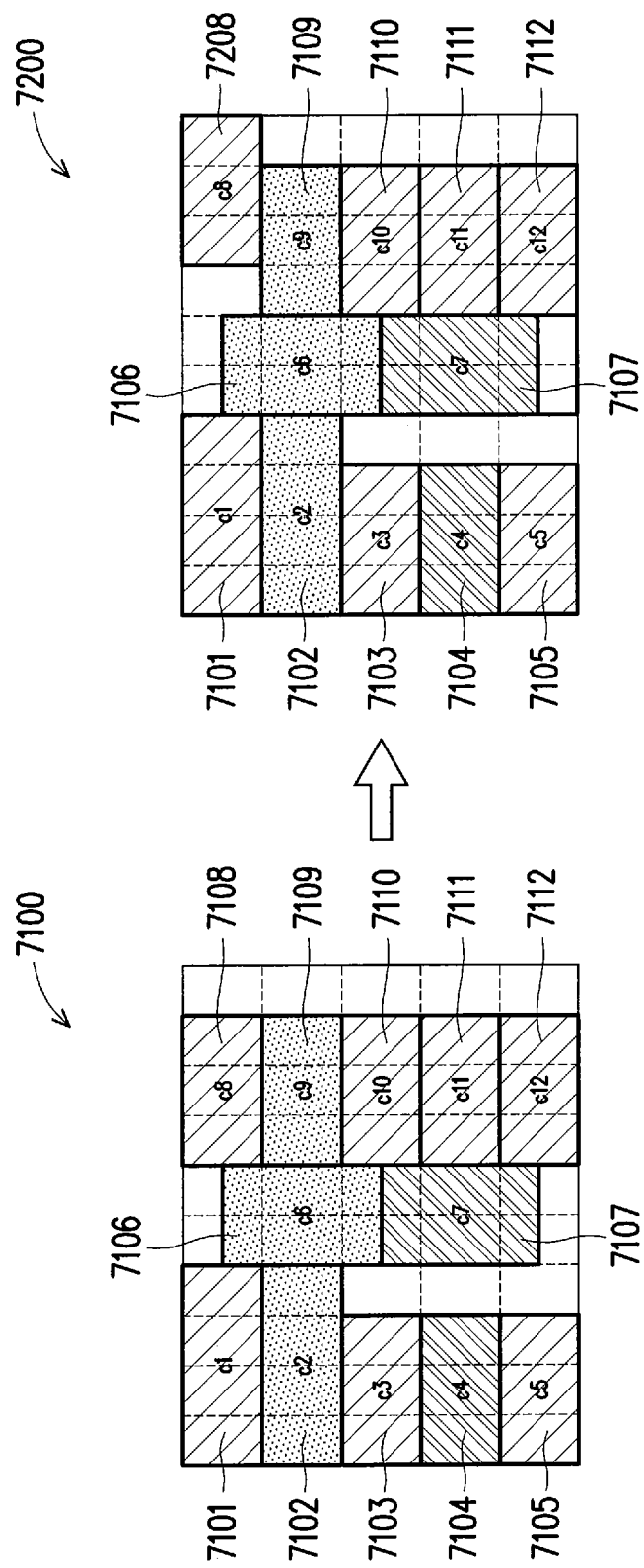
FIG. 7 is a schematic illustration of a front end rule compliance placement of a heterogeneous PG cell structure, in accordance with some embodiments.

FIG. 7 is a schematic illustration of the front end rule compliance placement of a heterogeneous PG cell structure, in accordance with some embodiments. According to some embodiments, an initial floorplan 7100 includes out-boundary PG cells 7101, 7102, 7103, 7104, 7105, 7108, 7109, 7110, 7111 and 7112. The floorplan 7100 also includes in-boundary PG cells 7106 and 7107. According to some embodiments, voltage cells 7102, 7106 and 7109 are standard threshold voltage cells, voltage cells 7104 and 7107 are low threshold voltage cells, and the rest are ultra-low threshold voltage cells. According to some embodiments, the front-end rule, also known as the voltage threshold rule ("VT rule"), requires a minimum width for a single cell which occupies at least three sites There are some manufacturing restrictions for the ion implant areas called the minimum implant area constraints. According to the constraint, each ion implant area must have a certain minimum width. In addition, two ion implant areas of the same type must be separated by a certain minimum spacing. In order to satisfy the front-end rule, the ultra-low threshold voltage out-boundary PG cell 7108 is shifted to the right to become cell 7208 in the floorplan 7200, so that half-row fillers can be inserted to satisfy VT minimum area rule. Additional half-row fillers will be added to fill the empty spaced left by such moving, which will be discussed in details in FIG. 8 below. The fillers are dummy blocks to occupy empty spaces in the layout. In accordance with some embodiments, shifting the location of cells to satisfy the VT rule as discussed above can result in improved power consumption and time characteristics for the resulting circuit.

Figure 8:
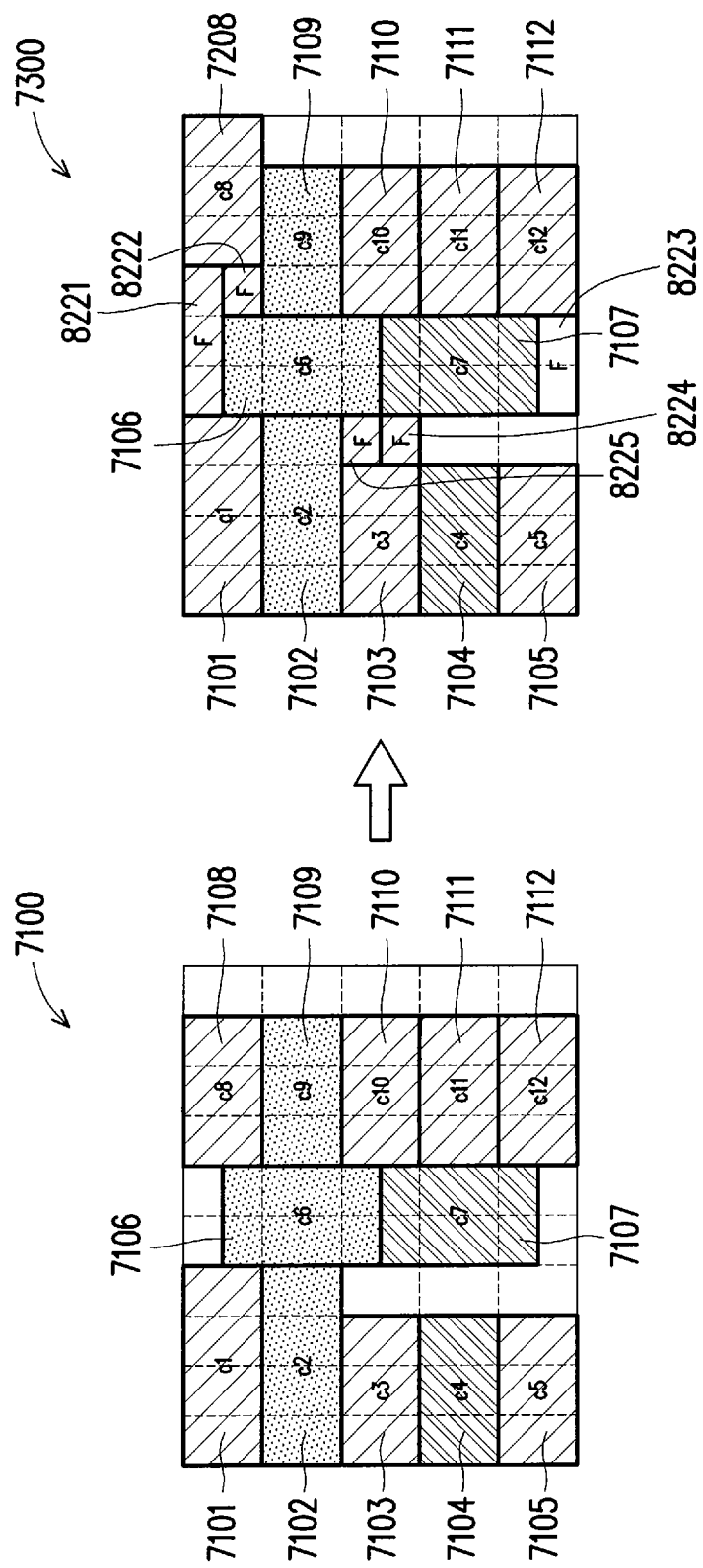
FIG. 8 is a schematic illustration of a VT-rule aware filler insertion of a heterogeneous PG cell structure, in accordance with some embodiments.

FIG. 8 is a schematic illustration of a process of filler insertion within the heterogeneous PG cell structure, in accordance with some embodiments. According to some embodiments, as discussed in FIG. 7, the cell 7108 is shifted to become cell 7208 in floorplan 7200. In floorplan 7300, half-row fillers 8221, 8222, 8223, 8224 and 8225 are inserted to satisfy the VT rule, as discussed above.

According to some embodiments, a method for partitioning a group of PG cells with at least one in-boundary PG cell and at least one out-boundary cell is disclosed. The method includes: placing at least one out-boundary PG cell on a substrate, wherein power strips of the at least one out-boundary PG cell are aligned with corresponding power rails on the substrate; and placing at least one in-boundary PG cell on the substrate, wherein power strips of the at least one in-boundary PG cell are aligned with corresponding power rails on the substrate.

According to some embodiments, a method for partitioning a group of PG cells with at least one in-boundary PG cell and at least one out-boundary cell is disclosed. The method includes: placing at least one out-boundary PG cell on a substrate; and placing at least one in-boundary PG cell on the substrate, wherein power strips of at least one of the at least one out-boundary PG cell and the at least one in-boundary PG cell are aligned with corresponding power rails on the substrate.

According to some embodiments, a method for partitioning a group of power-ground (PG) cells is disclosed. The method includes: placing a plurality of out-boundary PG cells selected from the group of PG cells on a substrate, wherein power strips of the plurality of out-boundary PG cells are aligned with corresponding power rails on the substrate; and placing a plurality of in-boundary PG cells selected from the group of PG cells on the substrate, wherein power strips of the plurality of in-boundary PG cells are aligned with corresponding power rails on the substrate.

According to some embodiments, the application programming interface further includes a floorplan unit for partitioning a plurality of received circuit blocks into functional modules, a placement unit for processing IC placement according to design rules, a clock tree synthesis unit for synthesizing clock tree for proper timing and clocking, a route unit for arranging routing, and a post-route unit for post-route processing for timing optimization.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for partitioning a group of power-ground (PG) cells with at least one in-boundary PG cell and at least one out-boundary cell, the method comprising:
   placing at least one out-boundary PG cell on a substrate, wherein power strips of the at least one out-boundary PG cell are aligned with corresponding power rails on the substrate;
   placing at least one in-boundary PG cell on the substrate, wherein power strips of the at least one in-boundary PG cell are aligned with corresponding power rails on the substrate; and
   changing the at least one out-boundary PG cell into an in-boundary cell by increasing a size of the at least one out-boundary PG cell to match a size of an in-boundary PG cell to form a new floorplan.

2. The method of claim 1, further comprising:
   keeping the at least one out-boundary cell in its original position.

3. The method of claim 1, further comprising:
   keeping the at least one in-boundary cell in its original position.

4. The method of claim 1, further comprising:
   optimizing timing of the new floorplan.

5. The method of claim 1, further comprising:
   forming a first partition by selecting the at least one in-boundary PG cell from the group of PG cells; and
   adding at least one out-boundary PG cell from the group of PG cells into the first partition.

6. The method of claim 5, further comprising:
   forming a second partition by selecting at least one PG cell from the group of PG cells.

7. The method of claim 6, further comprising:
   calculating a total area of the in-boundary PG cells in the first partition; and
   calculating a total area of the out-boundary PG cells in the first partition.

8. The method of claim 7, further comprising:
   calculating a total area of the in-boundary PG cells in the second partition; and
   calculating a total area of the out-boundary PG cells in the second partition.

9. The method of claim 8, further comprising:
   calculating a difference between the total areas of in-boundary PG cells in the first partition and the out-boundary PG cells in the first partition; and
   calculating a difference between the total areas of in-boundary PG cells in the second partition and the out-boundary PG cells in the second partition.

10. The method of claim 9, further comprising:
    maximizing the difference between the total areas of in-boundary PG cells in the first partition and the out-boundary PG cells in the first partition by adjusting the number of in-boundary PG cells in the first partition and the out-boundary PG cells in the first partition; and
    maximizing the difference between the total areas of in-boundary PG cells in the second partition and the out-boundary PG cells in the second partition by adjusting the number of in-boundary PG cells in the second partition and the out-boundary PG cells in the second partition.

11. A method for partitioning a group of power-ground (PG) cells with at least one in-boundary PG cell and at least one out-boundary cell, the method comprising:
    placing at least one out-boundary PG cell on a substrate;
    placing at least one in-boundary PG cell on the substrate, wherein power strips of at least one of the at least one out-boundary PG cell and the at least one in-boundary PG cell are aligned with corresponding power rails on the substrate; and
    changing the at least one out-boundary PG cell into an in-boundary cell by increasing a size of the at least one out-boundary PG cell to match a size of an in-boundary PG cell to form a new floorplan.

12. The method of claim 11, further comprising:
    keeping the at least one out-boundary cell in its original position.

13. The method of claim 11, further comprising:
    keeping the at least one in-boundary cell in its original position.

14. The method of claim 11, further comprising:
    optimizing timing of the new floorplan.

15. The method of claim 11, further comprising:
    forming each of a plurality of partitions by selecting at least one in-boundary PG cell from the group of PG cells; and
    adding at least one out-boundary PG cell from the group of PG cells into each of the plurality of partitions.

16. The method of claim 15, further comprising:
    calculating a total area of the in-boundary PG cells in each of the plurality of partitions; and
    calculating a total area of the out-boundary PG cells in each of the plurality of partitions.

17. The method of claim 16, further comprising:
    calculating a difference between the total areas of in-boundary PG cells and the out-boundary PG cells in each of the plurality of partitions; and
    maximizing the difference by adjusting numbers of the in-boundary PG cells and the out-boundary PG cells in each of the plurality of partitions.

18. A method for partitioning a group of power-ground (PG) cells, the method comprising:
    placing a plurality of out-boundary PG cells selected from the group of PG cells on a substrate, wherein power strips of the plurality of out-boundary PG cells are aligned with corresponding power rails on the substrate; and
    placing a plurality of in-boundary PG cells selected from the group of PG cells on the substrate, wherein power strips of the plurality of in-boundary PG cells are aligned with corresponding power rails on the substrate; and
    changing at least one out-boundary cell into an in-boundary cell by increasing a size of the at least one out-boundary cell to match a size of an in-boundary cell to form a new floorplan.

19. The method of claim 18, further comprising:
    forming each of a plurality of partitions by selecting at least one in-boundary PG cell from the group of PG cells; and
    adding at least one out-boundary PG cell from the group of PG cells into each of the plurality of partitions.

20. The method of claim 18, further comprising:
    calculating a total area of the in-boundary PG cells in each of the plurality of partitions; and
    calculating a total area of the out-boundary PG cells in each of the plurality of partitions.

* * * * *